No. 672,001. Patented Apr. 16, 1901.
G. J. HOSKINS.
MACHINE FOR CLOSING LOCKING BARS OF RIVETLESS PIPES.
(Application filed Oct. 11, 1900.)
(No Model.) 2 Sheets—Sheet 1.
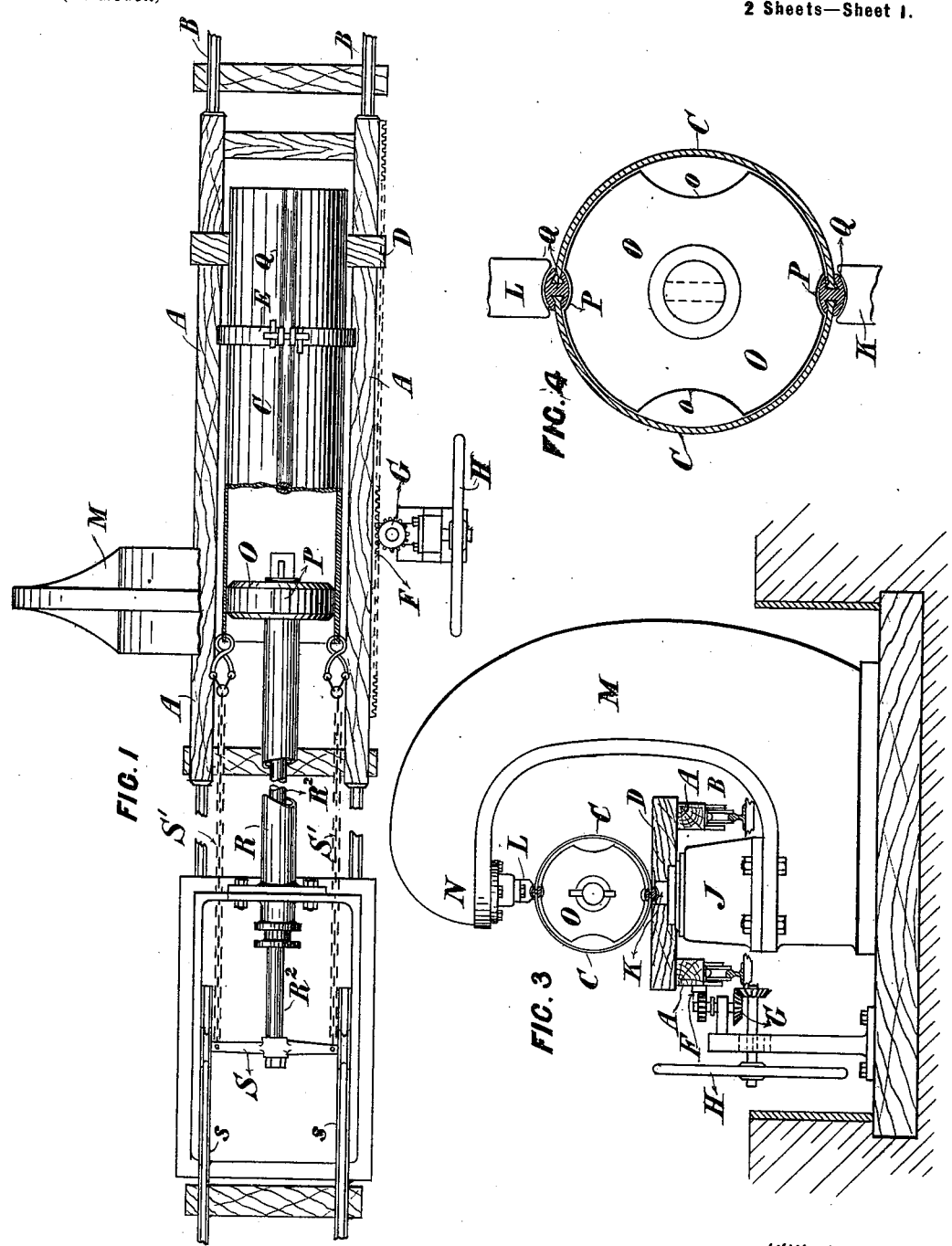

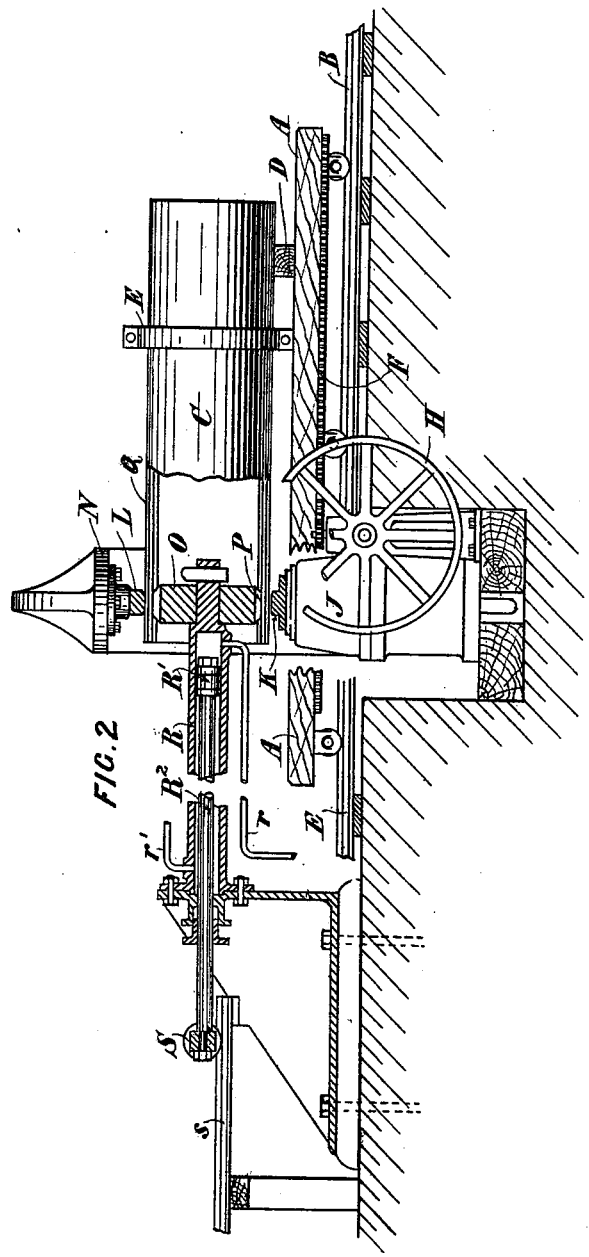

UNITED STATES PATENT OFFICE.

GEORGE J. HOSKINS, OF SYDNEY, NEW SOUTH WALES, ASSIGNOR TO G. & C. HOSKINS, OF SAME PLACE.

MACHINE FOR CLOSING LOCKING-BARS OF RIVETLESS PIPES.

SPECIFICATION forming part of Letters Patent No. 672,001, dated April 16, 1901.

Application filed October 11, 1900. Serial No. 32,804. (No model.)

*To all whom it may concern:*

Be it known that I, GEORGE JOHN HOSKINS, a subject of the Queen of Great Britain and Ireland, and a resident of Sydney, in the county of Cumberland and Colony of New South Wales, have invented certain new and useful Appliances to be Used in Closing the Locking-Bars on the Longitudinal Joints of Certain Types of Rivetless Metal Pipes, of which the following is a specification.

This invention has been specially devised for the purpose of, first, handling long wrought-iron pipes with greater facility while the seams are being closed, and, second, for closing the longitudinal seams of the locking-bar.

The pipes for which the invention is specially applicable are generally made of two plates bent into semicircular form, the two concave surfaces being opposite one another, and at the points where the two semicircular halves meet locking-bars of ⊐⊏-section similar to that patented by E. Quadling in Great Britain, No. 2,157, and dated April 28, 1883, are placed, each channel in the bar receiving one of the edges of the semicircular half-pipe. The whole is then clamped together and placed in a machine in order to close the sides of the channels in the locking-bars onto the adjacent edges of the pipe.

The two main features of the invention are, first, a longitudinal carriage or truck running on rails, upon which the pipe to be closed may be placed and run into the machine from the end, and, second, a solid block or anvil which is combined with hydraulic or other appliances, whereby while the anvil remains stationary the hydraulic appliances may impart to the pipe an intermittent longitudinal movement.

In the accompanying drawings, Figure 1 is a plan of the machine, the pipe being partly in section for the purpose of showing the block or anvil. Fig. 2 is a side elevation, part of the pipe, the anvil, and hydraulic appliances being in section. Fig. 3 is an end elevation; and Fig. 4 is a detail on a larger scale, showing a section of the pipe and locking-bars, the anvil or block being in end elevation.

A is the special carriage which runs upon rails B, that are placed longitudinally within the machine. By this means it is possible to place the pipe upon the carriage and run it into the machine from the end, thereby greatly facilitating the operations to be subsequently performed. C is the pipe which is placed upon chocks D on the carriage A. The two semicircular halves of the pipe are clamped together by clamps E, Fig. 1, and the carriage A, supporting the pipe C, is then run into the machine from the end. The carriage A is provided with a side rack F, which gears with the gearing G, that is operated by the hand-wheel H. The simple mechanical appliances are so clearly shown in the drawings that it is unnecessary to further describe them. The hand-wheel H and its appurtenances are specially adapted for running the truck A into the machine; but it will also prove very useful as an auxiliary to the hydraulic appliances to be hereinafter described and which impart an intermittent inward movement to the pipe when the joints are being closed.

At any suitable position within the machine is placed a hydraulic ram J, the upper end of the plunger of which is provided with a die or closing-tool K. Immediately above the center of the closing-tool K is a pressure piece or anvil L, whereby the upward pressure of the die K will be resisted. This pressure piece or anvil L may be supported in any appropriate manner, the device shown in the drawings consisting of a pillar M, with a lateral projection N, to the outer extremity of which the pressure-piece L is attached. The pressure-piece L may, however, be mounted in any way such that it shall be plumb above the hydraulic ram and closing-tool K and be capable of resisting the upward pressure of the ram.

O is the internal block or anvil, which is permanently fixed intermediately between the closing-tool K and the upper anvil L, with a space above and below it sufficient to allow of the free passage between itself and the outer tools K and L of the pipe and locking-bars. In the same vertical line with the tools K and L the anvil O is recessed at P, such recesses acting really as matrix-dies, so that when the pressure is applied by the ram below the locking-bars Q shall be caused to assume the shape shown specially in Fig. 4.

Projecting rearward and axially from the block or anvil O is a hydraulic cylinder R, provided with a piston and plunger R' R². The rear of the plunger is secured to a cross-head S, which travels on rails s. The cross-head S is provided with chains or rods S', which are secured to the pipe in any suitable manner at s', or the rods or chains may pass through the segmental openings o in the anvil O and be hooked onto the rear end of the pipe, thus obtaining a greater hauling purchase. The hydraulic cylinder R is provided with an inlet-pipe r and an outlet-pipe r' and with suitable valves. (Not shown in the drawings.)

The *modus operandi* is as follows: The pipe on the truck A being run in at the end of the machine, the extreme forward end of the pipe and locking-bars will lie between the internal anvil O and the tools K L. Hydraulic pressure is then applied through the ram to the tool K, when it will be found that the locking-bars Q will be closed onto the two adjacent edges of the two semicircular halves of the pipe C. When the locking-bar is perfectly secured, the hydraulic pressure through the closing-tool K is removed and hydraulic pressure is applied in the cylinder R. This will cause the cross-head S to advance, and by means of the chains S' the pipe will be drawn along with it. This is the operation which may be assisted by the hand-wheel H and its accompanying gearing as an auxiliary. When the pipe has been drawn a sufficient distance, the pressure is removed in the cylinder R and reapplied in the cylinder J, and so on until the whole length of the joint has been closed. The pipe may then be run out on the carriage A and a fresh one run in.

Having now particularly described and ascertained the nature of my said invention and in what manner the same is to be performed, I declare that what I claim is—

In an apparatus for closing the seams of metal pipes the combination with a stationary upper anvil and a lower stationary closing-tool, of a stationary block or internal anvil located between said upper anvil and tool, a hydraulic ram carried axially of said internal anvil, and attaching devices between the piston-rod of said ram and the pipe to be drawn, substantially as described.

In testimony whereof I have hereunto set my hand in presence of two witnesses.

GEORGE J. HOSKINS.

Witnesses:
 MANFIELD NEWTON,
 R. W. EWERS.